Dec. 2, 1969  G. E. FENNER  3,482,189
FREQUENCY CONTROL OF SEMICONDUCTIVE JUNCTION
LASERS BY APPLICATION OF FORCE
Filed March 24, 1964  2 Sheets-Sheet 1
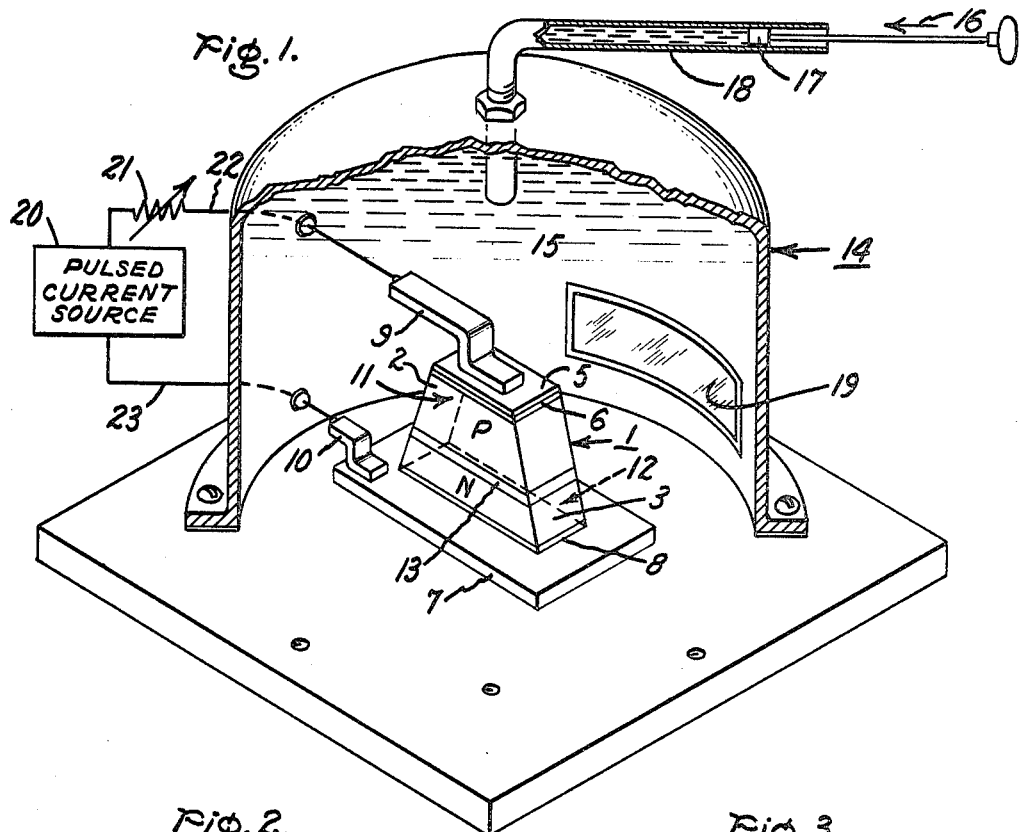
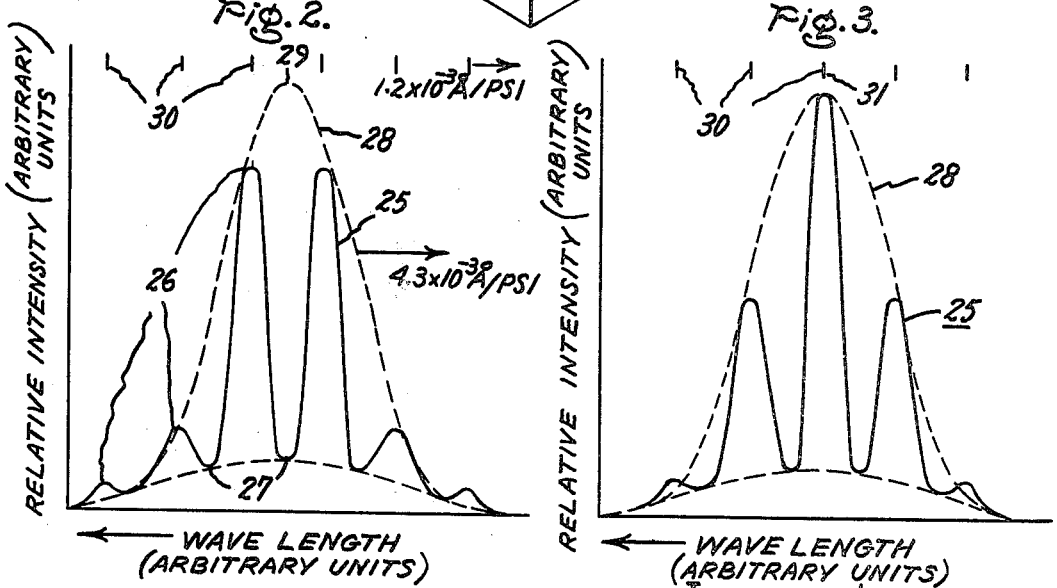
Inventor:
Gunther E. Fenner,
by John F. Ahern
His Attorney.

United States Patent Office 3,482,189
Patented Dec. 2, 1969

3,482,189
FREQUENCY CONTROL OF SEMICONDUC-
TIVE JUNCTION LASERS BY APPLICA-
TION OF FORCE
Gunther E. Fenner, Schenectady, N.Y., assignor to General Electric Company, a corporation of New York
Filed Mar. 24, 1964, Ser. No. 354,369
Int. Cl. H01s 3/18
U.S. Cl. 332—7.51           3 Claims

ABSTRACT OF THE DISCLOSURE

Frequency of coherent radiation produced by a semiconductor junction laser is controllably altered by applying a mechanical stress to the crystal body of the laser. When this mechanical stress is applied in the form of hydrostatic pressure, the wavelength shift of stimulated emission response curves and modes is several times more responsive to variations in pressure than when the mechanical stress is applied in the form of uniaxial pressure.

The present invention relates to systems for providing coherent radiation, and more particularly pertains to systems of this type utilizing semiconductive devices and providing frequency selection and control of the coherent radiation obtained.

The discovery of means to provide coherent radiation of light, or light having uniform wave properties, has enabled the use of light in many ways previously exclusively reserved for radiation in the radio frequency spectrum and has extended the usefulness of electromagnetic radiation beyond heretofore known applications, owing in part to the very small wavelength of coherent radiation that now can be obtained. Semiconductor diodes adapted to provide generation of stimulated coherent radiation are described in an article entitled "Coherent Light Emission From P-N Junctions" appearing in Solid-State Electronics, vol. 6, page 405 (1963), that is intended to be incorporated herein by reference thereto. Diodes of this type are referred to herein as semiconductor junction lasers and are disclosed and claimed in U.S. patent application Ser. No. 232,846, filed Oct. 24, 1962, now Patent No. 3,245,002, issued Apr. 5, 1966, and assigned to the assignee of the present invention.

The discovery of the semiconductor junction laser enabled more efficient generation of stimulated coherent radiation of light, not necessarily visible but infrared as well, and also of microwave frequencies, utilizing less complex equipment. In many applications of semiconductor junction lasers there are a plurality of different frequencies, or modes, at which oscillations occur, and at which stimulated coherent emission of radiation is obtained. It would be highly desirable to provide means for controlling the semiconductor junction laser output to have maximum intensity at the frequency of one selected mode. Additionally, it would be highly desirable to provide means for varying the frequency of the selected mode in applications, for example, where frequency modulation of the coherent radiation is desired or when the output frequency of the laser is to be closely matched with the frequency of an already existing system.

Accordingly, it is an object of my invention to provide a coherent radiation source having means to control the frequency of the emitted coherent radiation.

Another object of my invention is to provide a coherent radiation source utilizing a semiconductive junction laser and including means to maximize the intensity of radiation in one of a plurality of possible modes of operation.

Still another object of my invention is to provide a coherent radiation source featuring a semiconductor junction laser and means to control the output frequency thereof.

Briefly, I have discovered that the peak of the stimulated emission curve, that may be likened to the gain versus frequency response curve of a vacuum discharge device tuned amplifier, changes in frequency more rapidly than the modes of oscillation change in frequency in response to mechanical stress applied to the semiconductive crystal of a semiconductor junction laser. Thus, by providing a coherent radiation source including a semiconductor junction laser and means to induce mechanical stress in the crystal body of the laser, as by providing one or more force transducers attached to the sides of the crystal body, the peak of the stimulated emission curve can be shifted in frequency relative to the frequency of the modes of permissible oscillation. The intensity of output radiation in a selected mode is increased by controlling the amount of stress applied to the crystal in such a manner as to cause the peak of the stimulated emission curve to occur at the same frequency as the frequency of the selected mode. Additionally, the smaller frequency shift that does occur in the modes in response to mechanical stress permits the frequency of the coherent radiation to be changed, or modulated, by varying the amount of mechanical stress about the predetermined magnitude of stress that is required to maintain substantial frequency alignment between the peak of the stimulated emission curve and the selected mode of oscillation.

The features of my invention that I believe to be novel are set forth with particularity in the appended claims. My invention itself, however, both as to its organization and method of operation, together with further objects and advantages thereof, may best be understood by reference to the following description taken in connection with the accompanying drawing in which:

FIGURE 1 is a perspective view, partially sectioned, of a typical coherent radiation source in accord with my invention;

FIGURE 2 is a graph of output radiation intensity versus wavelength for one condition of operation of the system of FIGURE 1;

FIGURE 3 is a graph of intensity of output radiation versus wavelength for another condition of operation of the system of FIGURE 1;

Figure 4:
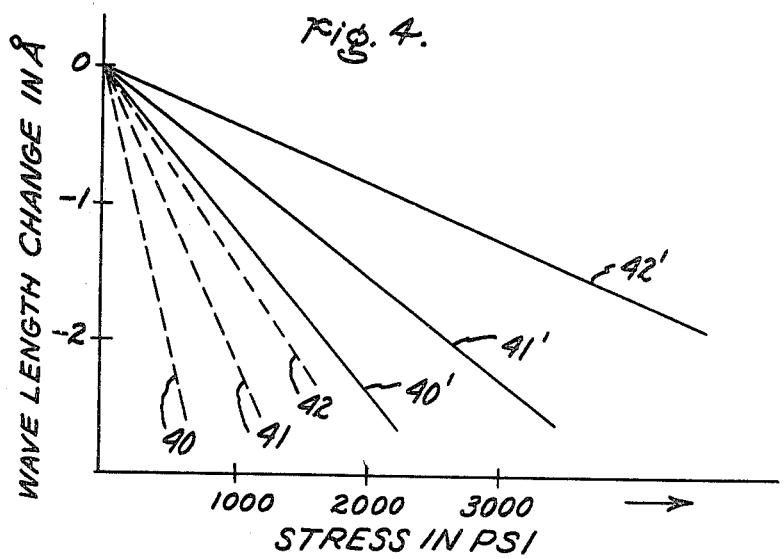
FIGURE 4 is a graph of wavelength change versus stress comparing the performances of three embodiments of the present invention; and, FIGURE 5 is an alternative embodiment of a coherent radiation source in accord with the present invention.

The source of coherent radiation illustrated in FIGURE 1 comprises a semiconductor junction laser generally indicated at 1 that is adapted to provide stimulated coherent emission of radiation in response to predetermined electrical excitation of its junction region. To this end, laser 1 is advantageously fabricated from a crystal of direct electron transition semiconductive material having a degenerately impregnated, or doped, P-type region 2 and a degenerately impregnated, or doped, N-type region 3. Non-rectifying or ohmic contact is made between the P-type region 2 and a first electrode 5 by means of an acceptor type or electrically neutral solder layer 6 and a non-rectifying connection is made between N-type region 3 and a second electrode 7 by means of a donor type or electrically neutral solder layer 8. Electrode connectors 9 and 10 are connected to electrodes 5 and 7, respectively, as, for example, by welding, brazing, etc. Parallel reflecting surfaces 11 and 12 (Fabry Perot faces) are adapted to sustain a standing electromagnetic wave between them in the junction region 13 that is contiguous with and located between regions 2 and 3.

Means to provide a mechanical stress on the external surfaces of the crystal body of laser 1 include a walled pressure vessel, generally indicated schematically at 14, that supports and entirely encloses laser 1. Vessel 14 is advantageously filled with a suitable liquid or gas. The hydrostatic pressure within vessel 14, and stress on the external surfaces of the semiconductive crystal, is controlled by any of a plurality of means including varying the force 16 acting upon a piston 17 that, in turn, compresses the fluid within a cylinder 18 which communicates with the interior of vessel 14.

Means to derive a useful output from laser 1 is shown as a narrow pressure-sustaining window 19 in the wall of vessel 14. Window 19 is advantageously located relative to laser 1 such that an unobstructed portion thereof lies in the plane of junction region 13. For optimum efficiency, fluid 15 and window 19 are of materials having high transmissivity over the range of frequencies in which stimulated coherent emission from laser 1 is obtained.

Laser 1 is activated to the emission of stimulated coherent radiation by the application of a forward bias, as for example, by the connection to a source of direct current of sufficiently high current capacity to cause the production of coherent radiation. Such a source is illustrated schematically at 20 and is connected to laser 1 through a variable series limiting resistor 21. Connections to electrodes 9 and 10 are effected through conductors 22 and 23, respectively, that extend through the wall of vessel 14 through a pressure tight seal therein. While a pulsed current source 20 is illustrated schematically, a continuous source is equally advantageously employed in many applications.

Temperature control means (not shown) are sometimes advantageously used and conveniently take the form of an additional vessel having a radiation-transmitting window therein in register with window 19 and forming with vessel 14 what is known in the art as a Dewar flask. The space between the two vessels is filled with a liquid or gas, as, for example, oxygen, helium or nitrogen, in order to regulate the ambient temperature of laser 1 in order to vary the value of current at which the threshold of stimulated coherent emission is achieved.

In operation, the source of electrical energy is energized and variable resistor 21 is adjusted to provide a decrease in resistance that results in increasing current density within junction region 13 of laser 1. The light output from laser 1 will be observed to be increased substantially linearly with increasing current density and to be incoherent. Thereafter, with continued decrease in the equivalent series resistance of resistor 21, the light output as seen through window 19 increases non-linearly and suddenly becomes coherent. Coherence is indicated by diffraction patterns perpendicular to the plane of the junction indicating a definite phase relationship between light emitted from different lateral portions of the P-N junction region 13 of laser 1. The threshold current density for coherent radiation is that current density at which coherent radiation first commences. Thereafter, laser 1 is operated at or above its threshold for coherent radiation.

The mechanical stress on the crystal body of laser 1 is increased by increasing force 16. As the hydrostatic pressure is increased in this way, the intensity of radiation, at a particular wavelength, from junction region 13 rises and falls and different modes successively become dominant. The pressure is advantageously increased until the mode closest to the desired output frequency dominates and thereafter the pressure is slightly varied in order to provide the exact output frequency required in any given application. The pressure is thereafter maintained at a constant value sufficient to provide continued coherent radiation at the desired frequency. Alternatively, when a precise frequency of output radiation is not required, the dominant mode closest to the range of frequencies desired is maximized in intensity by varying the hydrostatic pressure. If desired, the intensity and frequency of output radiation are varied by varying the hydrostatic pressure. Because the gain versus frequency response curve of laser 1 is normally much broader than the frequency range of the individual modes, appreciable frequency shift is oftentimes obtainable without substantial variation in intensity. The latter characteristic is, of course, enhanced by providing devices with broader gain versus frequency characteristics. Conversely, when mode separation is the paramount consideration, devices having a narrow gain versus frequency characteristic are advantageously employed and the separation of Fabry Perot faces is decreased in order to provide a greater frequency difference between adjacent modes.

The material from which laser 1 is fabricated is normally monocrystalline and may be composed in general of a compound semiconductor or an alloy of compound semiconductors from the Group III–V (of the Periodic Table) class which are denominated as direct transition semiconductors (adapted to direct transitions of electrons between valence and conduction bands) and may include, for example, gallium arsenide, indium antimonide, indium arsenide, indium phosphide, gallium antimonide and alloys therebetween and may further include direct transition alloys of other materials such as alloys of gallium arsenide and gallium phosphide (indirect by itself) in the range of zero to approximately 50 atomic percent of gallium phosphide. For a further discussion of direct transition semiconductors reference is hereby made to an article by H. Ehrenreich in the Journal of Applied Physics, vol. 32, page 2155 (1961). Other suitable direct transition semiconductor materials include lead sulphide, lead selenide and lead telluride. In these latter materials indium is suitable as a donor and excess anion is suitable as an acceptor. The wavelength of the emitted radiation depends upon the band gap (the energy difference between the conduction band and the valence band) of the chosen semiconductor.

Both the N-type and the P-type regions of the monocrystalline body of laser 1 are impregnated or doped with donor or acceptor activators, respectively, to cause degeneracy therein. As used, herein, a body may be considered to be degenerate N-type when it contains a sufficient concentration of excess donor impurity carriers to raise the Fermi level thereof to a value of energy higher than the minimum energy of the conduction band on the energy band diagram of the semiconductive material. In a P-type semiconductor body or region, degeneracy means that a sufficient concentration of excess acceptor impurity carriers exist therein to depress the Fermi level to an energy lower than the maximum energy of the valence band on the energy band diagram for the semiconductive material. At the normal operating temperatures of semiconductor junction lasers, degeneracy is usually obtainable when the excess negative conduction carrier concentration exceeds $10^{17}$ per cubic centimeter or when the excess positive conduction carrier concentration exceeds $10^{18}$ per cubic centimeter. The Fermi level of an energy band diagram is that energy at which the probability of there being an electron present in a particular state is equal to one half.

The material suitable for rendering degenerately N and P-type the various semiconductors with which the laser of the present invention may be constructed depends upon the semiconductive material utilized and is not necessarily the same in each case, even though the semiconductive materials may be included in the same class. Thus, all of the Group III–V Periodic Table compounds utilize sulphur, selenium and tellurium as donors and zinc, cadmium, mercury and caesium as acceptors, on the other hand, the elements tin, germanium and silicon may serve either as donors or acceptors depending upon the particular semiconductor and the method of operation. For example, in gallium antimonide grown from a stoichiometric melt they are all acceptors. In indium antimonide, tin is a donor, whereas germanium and silicon are acceptors. In the remaining direct transition semiconductors of the Group III–V type, tin, germanium and silicon are all donors. Any donor and acceptor pair that have sufficiently high solubility for the material utilized to form the semiconductive crystal may be utilized to form the degenerately impregnated or doped regions of laser 1.

While a number of methods are suitable for fabrication of laser 1, the following example is intended to illustrate a particularly convenient method to those skilled in the art. A system as shown in FIGURE 1 includes a laser fabricated from a monocrystalline ingot of N-type gallium arsenide which is impregnated or doped with approximately $10^{18}$ atoms per cubic centimeter of tellurium. The impregnation is achieved, conveniently, by growth from a melt of gallium arsenide containing at least $5 \times 10^{18}$ atoms per cubic centimeter of tellurium to cause the resulting crystal to be degenerately N-type.

A junction region is formed in a horizontal surface of the crystal by diffusing zinc into all surfaces thereof at a temperature of approximately 900° C. for approximately one half hour using an evacuated sealed quartz tube containing the gallium arsenide crystal and 10 milligrams of zinc. The P–N junction so formed is approximately 0.05 millimeter below all surfaces of the crystal. The crystalline wafer is then cut and ground to remove all of the P-type region except for the region on one horizontal surface.

A monocrystalline body is then cut, or cleaved, from the wafer and is typically 0.5 millimeter thick and 0.4 millimeter along each edge. Two opposing faces of the crystal body are then polished to optical smoothness, to exact parallelism, and perpendicular to the P–N junction region.

Thereafter the respective electrodes are soldered to the semiconductive body. With the aforementioned gallium arsenide semiconductive material, acceptor solder is an alloy of 3 weight percent zinc, the remainder being indium, and donor solder is tin, for example.

When the above-described semiconductive body is immersed in a Dewar of liquid air at a temperature of approximately 77° K. the threshold for coherent emission occurs at approximately 1000 amperes per square centimeter and decreases to less than 200 amperes per square centimeter at 20° K. When the junction area of laser 1 in selected to be approximately .001 centimeter$^2$, a one ampere source of electrical pulses 20 is sufficient at 77° K., as is a 0.2 ampere source at 20° K.

The material from which pressure vessel 14 is fabricated is conveniently selected to be stainless steel. When laser 1 has a range of output frequencies typical of gallium arsenide, a suitably transmissive fluid 15 is n-pentane or inert gas and the material of window 19 is advantageously selected as sapphire or fused quartz.

FIGURE 2 is a graph of relative intensity versus wavelength illustrating the output spectrum and gain curve for stimulated coherent radiation from laser 1 under conditions of constant temperature and pressure and during typical operation of the source of coherent radiation. The solid line curve generally designated at 25 indicates the shape of the frequency spectrum curve of radiation from laser 1 and has a plurality of maximum points 26 and minimum points, or valleys, 27 (generally lying along the response curve for spontaneous emission) that characterize the output radiation obtained from semiconductor junction lasers. The response, or gain, for stimulated emission from the semiconductive junction is indicated by dashed curve 28 and is seen to have a maximum, or peak, point 29. It is the rate of change of gain for stimulated emission with reference to wavelength, or frequency, in response to variations in stress on the crystal that is of paramount significance in the present invention. For convenience, the wavelength of a plurality of modes of operation, as indicated at 30, are indicated by short lines spaced along the abscissa. In FIGURE 2, the peak of the response curve, for stimulated emission, of laser 1 occurs substantially midway between two of the possible modes of oscillation.

I have discovered that in semiconductive junction lasers the response curve 28, for stimulated emission, translates to the right, as seen in FIGURE 2, under the influence of increasing pressure at a rate different from the corresponding rate of translation of the modes of resonance, or oscillations. In gallium arsenide semiconductive junction devices at 200° K, for example, the per unit wavelength change of the peak of the stimulated emission response curve is $-7.6 \times 10^{-6}$ per atmosphere change in hydrostatic pressure. The corresponding shift, or translation, of the modes, as indicated at 30, is at the much slower rate of $-2.1 \times 10^{-6}$ per atmosphere change, or about 3½ times slower. Thus, under the influence of increasing pressure, response curve 28, for stimulated emission, of FIGURE 2 translates to the right more rapidly than do resonance points 30 providing an output spectrum having maximum points 26 that bob as evenly spaced corks in response to a wave of fluid upon which they are floating.

FIGURE 3 illustrates a typical output frequency spectrum of the radiation from laser 1 when response curve 28, for stimulated emission, has been translated in wavelength relative to modes 30 to the extent that the wavelength of the peak 29 of response curve 28 occurs at the same wavelength as one of modes 30. The dominance of the selected mode 31 is readily apparent from the greatly increased intensity of radiation occuring at the wavelength of mode 31. The remaining modes are subdued in their influence on the intensity of output radiation at their respective wavelengths because there is less amplification, or gain, for stimulated emission at their respective wavelengths.

FIGURE 4 is a graph of wavelength change in angstroms versus stress in pounds per square inch for a gallium arsenide semiconductor junction laser at a temperature of about 200° K. Curves 40 and 40' indicate the wavelength translation of the stimulated emission response curve and modes, respectively, in response to variations in stress induced by forces applied to all surfaces of the crystal body. In other words, curves 40 and 40' illustrate the actual magnitude of wavelength shift obtained in a system as illustrated in FIGURE 1 wherein hydrostatic pressure is exerted upon the laser. Curves 41 and 41' show the wavelength translation of the response curve and modes, respectively, when the laser is subjected to stress on only two pairs of opposite sides and curves 42 and 42' show the corresponding response when the stress is induced in the crystal body by forces applied to only two opposite surfaces. The latter condition is sometimes referred to as uniaxial stressing of the body. That is to say, all of the forces applied to the body lie along essentially parallel axes.

From FIGURE 4 it can be seen that the wavelength shift, of the response curve and modes, is about three times more responsive to variations in hydrostatic pressure than to variations in uniaxial pressure. While application of hydrostatic pressure yields a system in accord with the present invention that is much more responsive to pressure variations it will be advantageous to select a system featuring uniaxial stress in many instances because, among other things, uniaxial stress is more easily induced in the crystal body in many applications.

Figure 5:
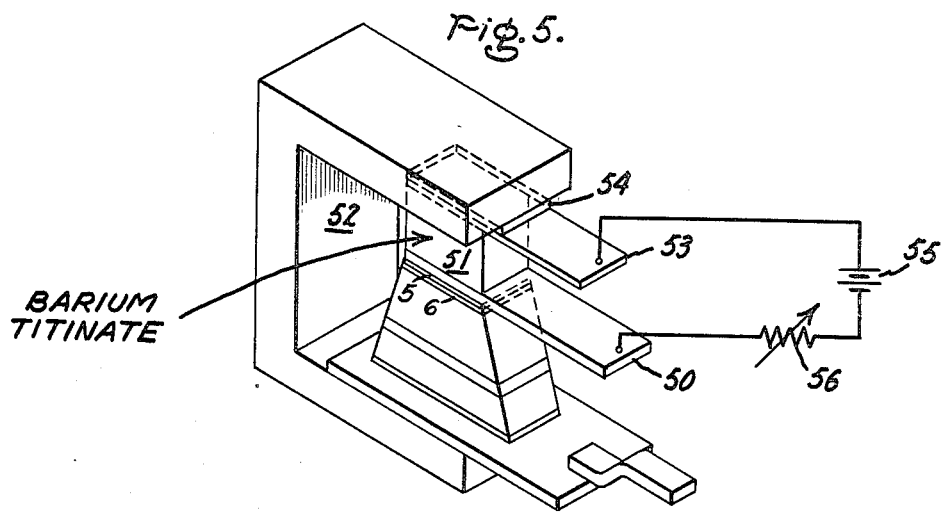

FIGURE 5 illustrates a source of coherent radiation in accord with the present invention, but utilizing uniaxial stress, rather than hydrostatic pressure as featured in the embodiment of FIGURE 1. The laser 1 of FIGURE 5 corresponds to laser 1 of FIGURE 1 and like numerals designate like portions thereof. The only change in the structure of laser 1 has been to replace electrode connector 9, that supplied curent to the P-type region in FIGURE 1, with a flat electrode connector 50 that facilitates coupling of uniaxial stress to the crystal body of laser 1 by providing a flat planar surface coextensive with the top surface of laser 1. Forces may readily be applied to the upper flat surface of electrode connector 50 to induce the desired uniaxial stress. A rectangular block 51 of barium titanate, or other suitable piezoelectric transducer material, is placed atop the surface of electrode 50 and is separated from one leg of a C-clamp 52 by a sheet of electrically conductive material 53 and an insulating spacer 54, in that order. Electrical connection to transducer 51 is made through electrode connector 50 and conductive metal sheet 53. Mechanical coupling of transducer 51 to the upper surface area of the crystal laser body is through electrode connector 50, electrode 55 and solder layer 6.

The source of electrical energy for transducer 51 is shown schematically as including a battery 55 connected in electrical series relationship with a variable resistor 56 in a series loop network including conductive sheet 53, transducer 51 and electrode 50. Application of voltage to transducer 51 causes the transducer to expand or contract along its vertical axis, in accordance with the well-known piezoelectric effect. The degree of expansion or contraction of transducer 51 is varied by adjusting resistor 56 in a manner well-known to those skilled in the art. The resulting force applied by transducer 51 imposes a uniaxial stress on the crystal body of laser 1 by compressing the laser between electrode 50 and the bottom of C-clamp 52 to a controllable degree.

As with many of the more complex physics phenomena, the exact nature of and mechanisms by which the pressure effects that I have observed in direct transition semiconductor junction laser devices, as described above, are not completely understood. However, the following theoretical explanation is offered. In a Fabry Perot resonator and other structures featuring parallel reflecting faces as resonant cavities and the like, the oscillating modes are determined by the separation of opposing faces as well as by the dielectric constant of the medium filling the space between the reflecting faces. Because the strain resulting from stressing semiconductive crystals is usually small to the point of being negligible, it appears that the frequency translation of the modes in response to applied stress is due to a change in the dielectric constant of the crystal in the junction region.

The amplification, or gain, obtained in the junction region of the semiconductor junction laser is achieved by creating a population inversion therein due to injected electrons. The emitted stimulated radiation is essentially at a value determined by the band gap of the semiconductive material in the junction region. Application of compressive stress to the semiconductive crystal increases the band gap and therefore increases the energy of the emitted radiation, resulting in a higher frequency and lower wavelength for the coherent output radiation. The rate of frequency translation with variations in stress, however, remains essentially constant.

In the direct transition semiconductive materials the electrons that are responsible for the generation of photons are thought to occupy conduction band states that possess a high degree of symmetry with respect to crystallographic direction. For this reason, only forces that affect the volume of the crystal lead to changes in the output frequency of the laser and pure shear forces have essentially no influence. This explains in part why the effect of mechanical stress is essentially proportional to the summation of stresses on the external surfaces of the crystal.

While only certain preferred features of the invention have been shown by way of illustration, many modifications and changes will occur to those skilled in the art. For example, a large number of mechanical and electromechanical stressing means can be used to advantage in accord with the present teaching and many means for coupling such stressing means to portions or all of the external surfaces of the crystal body will readily suggest themselves to those skilled in the art. Additionally, tensile stress is employed to equal advantage, rather than compressive stress, in many applications. It is, therefore, to be understood that the appended claims are intended to cover all such modifications and changes as fall within the true spirit and scope of the invention.

What I claim as new and desire to secure by Letters Patent of the United States is:

1. A stimulated coherent emission source comprising: a monocrystalline body of a direct transition semiconductive material; a first region within said body having degenerate N-type conductivity characteristics; a second region within said body having degenerate P-type conductivity type characteristics; a P-N junction region located intermediate and contiguous with said first and second regions, said P-N junction region being adapted to provide stimulated emission of radiation with maximum gain at a predetermined wavelength in response to predetermined electrical excitation thereof; at least two surface portions of said body defining a resonant cavity, including at least a portion of said P-N junction region, having a plurality of modes of oscillation to permit a standing wave of electromagnetic energy to be established between said two surface portions; contact means making ohmic contact with each of said first and second regions, said contact means being connected to a source of electrical energy to provide said excitation; and, means coupled to said body including a compressible medium surrounding said body and adapted to provide a mechanical stress of controllable magnitude on at least a portion of the external surface of said body, said predetermined wavelength being variable relative to the wavelength of said modes in response to variations in the magnitude of said stress.

2. A stimulated coherent emission source comprising a monocrystalline body of a direct transition compound semiconductive material; a first region within said body having degenerate N-type conductivity characteristics; a second region within said body having degenerate P-type conductivity characteristics; a planar P-N junction region located between and contiguous with said first and second regions having conductivity characteristics intermediate the conductivity characteristics of said first and second regions; at least two surface portions of said body being essentially parallel with each other, essentially perpendicular to said P-N junction region at the intersection therewith and of sufficiently high reflectivity to permit a standing wave of electromagnetic energy in a plurality of modes characterized by differing wavelengths to be established between said two surface portions through at least said junction region; contact means making ohmic electrical contact with each of said first and second regions; means for applying a unidirectional current to said body sufficient to bias the P-N junction region between said first and second regions in the forward direction to provide amplification by stimulated emission and emission of stimulated coherent radiation, having intensity maxima at the wavelengths of said modes, through at least one of said surface portions, said amplification by stimulated emission having a maximum gain at a predetermined wavelength; and, means coupled to said body and adapted to provide a mechanical stress of controllable magnitude on at least a portion of the external surface of said body, said predetermined wavelength and the wavelengths of said modes being variable at differing rates in response to variations in the magnitude of said stress so that changes in the output radiation frequency spectrum are effected by varying the magnitude of said stress, said magnitude varying within a range sufficient to provide substantial equality between said predetermined wavelength and the wavelength of one of said modes so that the effect of said one mode upon the frequency and intensity of emitted coherent radiation dominates over the effects of other modes thereupon.

3. A stimulated coherent emission source comprising: a monocrystalline body of a direct transition compound semiconductive material; a first region within said body having degenerate N-type conductivity characteristics; a second region within said body having degenerate P-type conductivity characteristics; a planar P-N junction region located between and contiguous with said first and second regions having conductivity characteristics intermediate the conductivity characteristics of said first and second regions; at least two surface portions of said body being essentially parallel with each other, essentially perpendicular to said P-N junction region at the intersection therewith and of sufficiently high reflectivity to permit a standing wave of electromagnetic energy in a plurality of modes characterized by differing wavelengths to be established between said two surface portions through at least said junction region; contact means making ohmic electrical contact with each of said first and second regions; means for applying a unidirectional current to said body sufficient to bias the P-N junction region between said first and second regions in the forward direction to provide amplification by stimulated emission and emission of stimulated coherent radiation, having intensity maxima at the wavelengths of said modes, through at least one of said surface portions, said amplification by stimulated emission having a maximum gain at a predetermined wavelength; and, means including a compressible medium coupled to said body and adapted to provide a compressive stress of controllable magnitude on essentially all of the external surface of said body, said predetermined wavelength and the wavelengths of said modes being variable at differing rates in response to variations in the magnitude of said stress so that changes in the output radiation frequency spectrum are effected by varying the magnitude of said stress.

References Cited

UNITED STATES PATENTS

| | | | |
|---|---|---|---|
| 3,145,354 | 8/1964 | Hutson | 332—26 |
| 3,183,359 | 5/1965 | White | 332—3 |
| 3,245,002 | 4/1966 | Hall | 331—94.5 |
| 3,387,230 | 6/1968 | Marinace | 332—7.51 |

OTHER REFERENCES

IBM—Journal of R & D, April 1963, Stevenson et al., vol. 7, No. 2, pp. 155 and 156.

ALFRED L. BRODY, Primary Examiner

U.S. Cl. X.R.

250—199; 307—312; 330—4.3; 331—94.5; 332—16